United States Patent
Shoshan et al.

(10) Patent No.: US 12,403,892 B2
(45) Date of Patent: Sep. 2, 2025

(54) CONTROLLABLE ELECTRIC VEHICLE AND A CONTROL SYSTEM THEREFOR

(71) Applicant: Plasan Sasa Ltd., M.P. Marom Hagalil (IL)

(72) Inventors: Amir Ben Shoshan, D.N. Chevel Korazim (IL); Asaf Engel, M.P. Marom Hagalil (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 396 days.

(21) Appl. No.: 17/737,350

(22) Filed: May 5, 2022

(65) Prior Publication Data

US 2022/0371576 A1     Nov. 24, 2022

(30) Foreign Application Priority Data

May 10, 2021    (IL) .......................................... 283080

(51) Int. Cl.
*B60W 20/40*     (2016.01)
*B60W 50/08*     (2020.01)

(52) U.S. Cl.
CPC .......... *B60W 20/40* (2013.01); *B60W 50/082* (2013.01); *B60W 50/085* (2013.01); *B60W 2510/18* (2013.01); *B60W 2510/20* (2013.01)

(58) Field of Classification Search
CPC ............. B60W 40/08; B60W 2540/01; B60W 2540/22; B60W 2540/229;
(Continued)

(56) References Cited

U.S. PATENT DOCUMENTS 8,627,908 B2 *   1/2014   Wellborn ................ B60L 15/42
                                                                                                                701/96
9,321,357 B2     4/2016   Caldeira et al.
(Continued)

FOREIGN PATENT DOCUMENTS

WO     2011046401 A2     4/2011
WO     2016161216 A1    10/2016

OTHER PUBLICATIONS

Holderith, TheWarZone, TheDrive, "Ford Looking at Charging EVs by Flat Towing Them," retrieved from https://www.thedrive.com/tech/41529/ford-looking-at-charging-evs-by-flat-towing-them on Aug. 3, 2022, Jul. 14, 2021.

*Primary Examiner* — Aniss Chad
*Assistant Examiner* — Stephanie T Su
(74) *Attorney, Agent, or Firm* — Ballard Spahr LLP

(57) ABSTRACT

A modular electric vehicle comprising a single module(s) with an electric driving system and a vehicle control unit, the modular vehicle is configured to be selectively articulated to a master vehicle and to be controlled from a selectable control source via the vehicle control unit either in a first, articulated mode, or in a second, autonomous mode. The control source may be selected to be in communication with a first gateway installed at the master vehicle or a second gateway installable at the modular vehicle. The modular electric vehicle may comprise a pair of single modules coupled to one another in tandem and in data and control communication with one another. The modules may each be configured to serve a master or a slave vehicle, so that any of the modules may serve a master vehicle, whenever required for the autonomous mode.

20 Claims, 4 Drawing Sheets

(58) Field of Classification Search
CPC ........ B60W 2555/20; B60W 2050/146; G01C 21/3605; G01C 21/3697
See application file for complete search history.

(56) References Cited

U.S. PATENT DOCUMENTS

| | | |
|---|---|---|
| 9,457,666 B2 | 10/2016 | Caldeira et al. |
| 9,857,255 B2 | 1/2018 | Hagan |
| 10,245,972 B2 | 4/2019 | Healy et al. |
| 10,518,831 B2 | 12/2019 | Wright |
| 10,752,102 B2 | 8/2020 | Lampsa et al. |
| 2003/0184152 A1 | 10/2003 | Cikanek et al. |
| 2006/0005736 A1 | 1/2006 | Kumar |
| 2006/0005738 A1 | 1/2006 | Kumar |
| 2011/0253463 A1 | 10/2011 | Smith |
| 2018/0022405 A1 | 1/2018 | Gecchelin et al. |
| 2018/0290561 A1 | 10/2018 | Baumgärtner |
| 2018/0338408 A1* | 11/2018 | Shinkai ................ G05D 1/0287 |
| 2018/0364738 A1 | 12/2018 | Bridges |
| 2019/0202431 A1 | 7/2019 | Richter et al. |
| 2020/0062306 A1 | 2/2020 | Shoshan et al. |
| 2020/0233410 A1 | 7/2020 | Burns et al. |
| 2021/0197673 A1 | 7/2021 | Espig et al. |
| 2022/0169252 A1* | 6/2022 | Yhr ........................ B60L 58/15 |
| 2024/0103544 A1* | 3/2024 | Kumagai ............... G05D 1/646 |

* cited by examiner

CONTROLLABLE ELECTRIC VEHICLE AND A CONTROL SYSTEM THEREFOR

TECHNOLOGICAL FIELD

The presently disclosed subject matter refers to a controllable electric vehicle which may serve as a slave vehicle in an articulated vehicles assembly, and to a control system for such vehicles. More specifically, the subject matter relates to implementations of such electric slave vehicles, to a suitable articulated assembly and to a suitable control system.

BACKGROUND

One example of a vehicle and an articulated vehicles assembly of the kind, to which the presently disclosed subject matter refers, is described in the Applicant's U.S. Ser. No. 16/546,671 filed on Aug. 21, 2019 and published as 2020/0062306.

Electric and hybrid-electric vehicles, as well as principles of their control are known in the art.

Basic solutions for power/battery management in electric and hybrid electric vehicles include, for example, a hybrid electric vehicle according to U.S. Pat. No. 8,639,409, which has a battery refillable by a base station. Another example is a power control system described in WO11046401 for electrically driven devices, which system can calculate energy for various operation modes. It is known that an electric/a hybrid vehicle may regenerate energy and recharge its battery while the vehicle is braking (for example, US2003184152).

Further, there are articulated vehicle assemblies where a master vehicle MA is connected to a slave vehicle (SV), and where the SV carries a chargeable battery. Usually the SV battery powers SV motor/wheels (for example, U.S. Pat. No. 9,857,255). The SV battery regeneration is possible by regenerative braking of SV (for example, U.S. Pat. No. 10,518,831).

In some cases, the SV battery may power a battery of the MV (U.S. Pat. Nos. 9,321,357 and 9,457,666 to Caldeira). There is an example where the SV battery powers a battery & drive motor of MV only (U.S. Pat. No. 10,752,102 to Lampsa).

The Inventors have discovered that controllable electric vehicles may bring new advantages, for example when used in articulated vehicle assemblies.

GENERAL DESCRIPTION

There is proposed a controllable electric vehicle configured
- to be articulated as a slave vehicle (SV) to a master vehicle (MV) having a master driving system, a master computer and a master onboard sensors arrangement,
- to be independently driven when not articulated to the master vehicle;
- said electric vehicle comprising
- an electric driving system having an electric motor and an electric battery; said motor, when operating as an electric generator, being capable of regenerating electric energy for charging said battery;
- a slave control unit capable of selecting a control source from at least two selectable control sources for establishing control and data communication there-with,
- a slave onboard sensors arrangement;
- wherein said slave control unit is configured to control the electric driving system using instructions received from the selected control source and an input from at least the slave onboard sensors arrangement, so as:
  - at a first control mode, at least when the electric vehicle is the slave vehicle articulated to the master vehicle, to select the control source providing the instructions via said master computer, to enable establishing communication between said master computer and said slave control unit, to enable at least partial self-driving of the slave vehicle based on electric energy accumulated in said battery, share driving force with the master vehicle (MV), and
  - at a second control mode, at least when the electric vehicle is not articulated to the master vehicle, to drive the electric vehicle autonomously.

The autonomous driving of the electric vehicle may be understood as driving according to instructions provided by any of the selectable control sources, be they outside or internal control sources. We keep in mind that the master vehicle may be controlled by the master computer receiving instructions from a driver only, but may alternatively or in addition be remotely controlled by an outside control source. Similarly, the slave vehicle, when in the second, independent control mode, may be controlled by an outside control source and/or by an internal control means (for example, forming part of the slave control unit or being in communication therewith).

In one embodiment, the slave control unit may be configured to select the first or the second control mode and to selectively receive said instructions using one of at least two following entities: a first device installed at the master vehicle and configured for receiving remote control signals, a second device installable at the slave vehicle and configurable for receiving remote control signals. There may be an additional exemplary entity—an internal, autonomous control means of the slave vehicle (for example, a hardware/software sub-unit of the control unit).

It should be noted that the slave control unit may apply two basic power management modes to the electric driving system, said modes being a motoring mode and a regeneration mode. Various modifications of the basic power management modes are possible, depending on specific given tasks, specific terrain, etc.

In the first, articulated control mode, selection of a current power management mode for the articulated electric vehicle may be performed at the master vehicle (e.g., by a driver and/or the master computer). At the second, autonomous control mode, a power management mode for the electric vehicle is selected autonomously.

However, combined solutions may exist; some of them will be described later, for example for a so-called tandem configuration of the controllable electric vehicle.

The outlined features of the proposed electric vehicle allow controlling its driving system flexibly and accurately by using input of one or both of the sensors' arrangements, while transporting considerable loads—both at the first control mode in an articulated vehicle assembly and at the second control mode as the autonomous vehicle. The proposed controllable electric slave vehicle allows assisting the master vehicle (for example, when the master vehicle drives sharply uphill), while being articulated to the master vehicle and controlled accordingly. The proposed features render improved ground maneuverability and turning capability to the proposed electric vehicle, resulting in a more effective vehicle mission-enabling performance.

In one specific embodiment, the control and data communication between the slave vehicle control unit and the selectable outside control source may be established using a communication cable switchable between said outside sources, for example via respective gateways.

One specific implementation of the above-proposed electric vehicle is a controllable modular electric vehicle EVMOD comprising at least a single EVMOD with the electric driving system having at least two driving wheels, said EVMOD being selectively controllable either at the first control mode as a slave vehicle, or at the second control mode as an independent (autonomous) vehicle.

It should be noted that the EVMOD may be configured to be interconnected in tandem with any second SV having at least two wheels, thereby forming a Tandem EVMOD. The second member in the Tandem EVMOD may be another EVMOD; said two EVMODS may be mechanically coupled and interconnected by a second communication cable.

In the case the Tandem EVMOD comprises two coupled EVMODS in communication with one another, said two EVMODS may respectively operate according to separately selected two power management modes. They may be different. For example, one of the EVMODS may implement a motoring mode, while the other one may implement a regeneration mode, thereby ensuring permanent workability of the tandem by maintaining at least one fully charged battery.

As noted, the mentioned EVMOD may serve as an autonomous vehicle AV. However, if required and when articulated to another vehicle, the EVMOD may serve as a master vehicle MV, namely: to pull after it said another vehicle as a slave vehicle (or to push said another vehicle before it) and to control the other articulated vehicle via the control unit (module control unit MODCU) of the EVMOD. The MODCU in the autonomous control mode may be controlled by an outside control source and/or by an internal control means and thus the EVMOD may serve as a master vehicle.

In a more specific embodiment, there is proposed a controllable modular electric vehicle EV comprising at least a single EV module (EVMOD) configured to be articulated as a slave vehicle to a master vehicle MV carrying its onboard MV computer in communication with the master's sensors arrangement, said EVMOD being provided with:
the controllable electric driving system EDS
the module's control unit MODCU in cooperation with the EVMOD sensors arrangement, for controlling the electric driving system EDS,
wherein
the MODCU is controllable from said selectable source via an entity/a device selectable from the following:
a first Gateway GW1 positioned at the MV in communication with the MV computer,
a second Gateway GW2 whenever installed at the EVMOD in communication with the MODCU,
an internal control means (software and/or hardware), whenever installed at the EVMOD in communication with the MODCU;
said EVMOD being configured to switch between the first control mode (articulated mode) and the second control mode (autonomous, independent mode).

It should be mentioned that the MV may be any type of the vehicle: a regular one, a hybrid-electric one, an electric one.

It may also be noted that the master vehicle's computer may be adapted to collect and proceed the driver's commands, directly or indirectly.

In one specific embodiment, the EVMOD is provided with the GW2. The GW2 unit may be installed at the EVMOD in advance or whenever required. For example, the GW2 unit may be part of an add-on appliance/plate detachably mountable on the EVMOD. Alternatively or in addition, the EVMOD may comprise an internal control means in communication with the control unit of the MODCU, for autonomous mode.

The selected GW may be brought into communication with the MODCU by using a first communication cable for exchanging data and control signals between the MODCU and the selected Gateway, for example by utilizing protocols such as CANBus, Ethernet, etc.

As mentioned, the electric driving system of the EVMOD comprises the electric engine capable of driving at least two wheels, and a controllably chargeable said electric battery (for example a high voltage HV multicell battery).

The MODCU may be configured to control the steering (STR), driving (DRV), braking (BRK) and power management (PM) functions of the electric driving system, the PM including also the Battery Charge management.

For example, based on the driver's commands, commands received from a selected outside control source and based on monitoring the driving systems of the master vehicle and the slave vehicle by respective sensor arrangements, the MODCU may be adapted to at least steer the slave vehicle so as to maintain said slave vehicle aligned with the master vehicle along a common longitudinal axis, at least when said master vehicle performs a turn on a horizontal plane.

Further, the MODCU may be designed to select various versions of main power management modes, depending on a current terrain, given tasks etc., for example: an economy mode, a mode of fast arrival to destination, a mode of maximal recharge (i.e., arrival to destination with a maximally possible charge of the battery, etc.) and to issue control commands according to the selected power management mode.

According to another specific embodiment of the disclosed subject matter, the modular electric vehicle EV may comprise a pair of said single EV modules (EVMOD) coupled to one another in tandem, wherein the MODCUs of the pair of EVMOD being interconnected, for example via a second communication cable. The coupling in the tandem may be rigid. The second communication cable may be of the same type as the first communication cable. The obtained configuration may be called a robotic tandem EVMOD.

In the tandem configuration, at least one of the modules may be configured to be constantly regenerating energy and recharging the battery when in the articulated mode.

It should be noted that once a Gateway (GW2) is provided on an EVMOD, that EVMOD becomes capable of receiving commands (say, by RF or Cellular channels) from any outside source of control, and thus may drive and operate autonomously based on the commands received from the outside source of control and depending on movement and operation ability of the EVMOD. The EVMODs of the tandem may each be configured so as to serve a master or a slave vehicle, as needed. Such EVMODs may thus change their status in the tandem, so that any of them may serve a master vehicle of the tandem whenever required.

The movement ability of the basic or single EVMOD depends, inter alia, on its wheels. The operation ability of EVMOD depends on the type of its load.

The single EVMOD may have just a single pair of driving wheels (though may have two regular pairs of wheels). Such an EVMOD may remain immobile/stationary when de-articulated from the described vehicles assembly. However, a single EVMOD may be provided with one or more auxiliary wheels. For example, the EVMOD comprising a pair of driving wheels connected to the electric motor, may also have a spare, additional pair of wheels extendable when needed. This may help when the single EVMOD should perform some independent, even restricted movement.

For example, the "single" EVMOD (be it two or four wheeled) may serve for transporting on it any loads, while being articulated to the MV. The single EVMOD may be then de-articulated at a destination point and left there for autonomous operation/service. The "tandem/robotic" EVMOD may be transported to the destination by the MV, de-articulated and then may start moving around and operating/servicing autonomously. The EVMOD may even become an MV if required, especially when it is a tandem one.

Movement of EVMOD may be controlled by the MODCU via the Gateway GW2 receiving remote commands from an outside control source. The EVMOD operation may be controlled by the Gateway GW2 (directly or indirectly) which receives suitable instructions remotely commanded via RF, Cellular communication, etc.

Both a "single" EVMOD and a "tandem/robotic" EVMOD may be adapted for controlling their additional operation/service, depending on the character and controllability of their load, and depending on commands received at the EVMOD from the source of remote control.

Some specific examples of the EVMOD load and suitable operations with the load will be further disclosed as the description proceeds.

The load may comprise fuel, spare mechanical and electronic parts, various equipment, medical products for first aid, weapons.

One specific embodiment of the EVMOD may be an EVMOD carrying weapons, wherein the weapons may be controlled by instructions received at the Gateway from a an outside remote control source via RF or other suitable bands of electromagnetic waves.

Another specific embodiment of the EVMOD may be an EVMOD serving as an On-Board Vehicle Power unit OBVP carrying, for example, an electric power source, a set of converters and/or inverters, a set of chargers, etc. Such an on-board power unit OBVP may charge electric vehicles, various electric appliances for example drones, computers, telephones, smart glasses etc. Any EVMOD (as well as the one carrying OBVP) may also carry reserve regular fuel for vehicles.

In a further embodiment, the on-board power unit (OBVP) may enable power exchange between EVMODs, optionally between EVMOD and MV, in case suitable power connections/lines are provided there-between.

In yet a different embodiment, an EVMOD may be loaded by food products and/or water. Such types of load may not require controlled operation by an outside remote source of control, though may require monitoring of presence/quantity/condition of the load by various sensors.

As mentioned, in a specific embodiment of the EV module (EVMOD), it may be provided with a Gateway (GW2) being either integral with the EVMOD, or forming part of an optional appliance detachably securable to the EVMOD. For example, the GW2 may be connectable with the MODCU via a third data communication cable.

The third data communication cable may constitute the same said first communication cable connected at one end to said MODCU, wherein its another end is switchable from the Gateway GW1 located on the MV to the Gateway GW2 located on the EVMOD, and back.

According to still a further specific embodiment, the MODCU may comprise four separate processors, for example in the form of four printed circuit boards (PCBs), respectively configured for performing the following four control functions at the suitable EVMOD: driving, braking, steering and power management.

According to an exemplary embodiment, said four processors may be identical from the hardware point of view, while configurable by software to the respective four control functions.

According to one further embodiment, the MODCU (for example, comprising the above-mentioned four processors implemented as four PCBs) may be located in a separate compartment provided in the EVMOD housing, said compartment being protected at least from mechanical deformations (for example, accidents, explosions). The four PCBs may be swappable out from said compartment.

According to yet a further specific embodiment, the first, second and third communication cables may be configured to enable data exchange for transmitting instructions and receiving feedback concerning the following control functions: driving, braking, steering, power management. For example, communication protocols like CANBus or Ethernet can be used. In a specific embodiment, the data exchange in each of the communication cables may be organized via four separate data exchange channels respectively assigned to said four control functions.

Optionally, the EVMOD may be provided with means for charging its battery from an external source of energy, and/or vice versa—for charging an external consumer of energy from the EVMOD battery.

An external source of energy may be, for example, a charging station, a battery of another EVMOD, etc. An external energy consumer may be any specific user, for example any electric or electronic appliance, another EVMOD or even the MV if the MV is a hybrid or electrical vehicle.

Further, there are described several independent products related to the disclosed subject matter.

For example, the proposed vehicle may be a modular electric one (an electric vehicle module) EVMOD comprising a controllable electric driving system, the EVMOD may be selectively articulated to a master vehicle MV and be controllable from a selectable control source either in a first, articulated mode of the EVMOD, or in a second, autonomous mode of the EVMOD, wherein said control source being selectable from a first Gateway GW1 installed on the MV, a second Gateway GW2 installable on the EVMOD and/or an autonomous hardware/software control means installable in the EVMOD.

The described EVMOD may serve as an "On Board Vehicle's Power" unit (OBVP), the EVMOD being adapted to carry and controllably operate one or more of the following non-exhaustive list of electric and electronic appliances: electric generators, inverters, converters, chargers (say, for drones, glasses, computers, telephones, etc).

If such EVMOD1 is connected in tandem with another similar EVMOD (EVMOD2), it forms a Tandem EVMOD where the electric driving system of EVMOD1 and the electric driving system of EVMOD2 may be respectively controllable according to selectable, separate power management modes.

According to a third aspect of the disclosed subject matter, there is provided an add-on appliance for use either with the described EVMOD or with the described controlled electric vehicle, the appliance may comprise a Gateway unit (say, GW2) detachably mountable on said vehicle (or EVMOD)

and configured to enable data and control communication between the Gateway unit and the MODCU of the EVMOD via a communication cable.

According to a fourth aspect of the disclosed subject matter, there is provided a control system configured to control an electric vehicle comprising an onboard sensors arrangement and an electric driving system EDS having an electric motor and an electric battery;
the vehicle control system comprising at least a vehicle control unit capable of selecting
  a control mode being either a first, articulated mode or a second, autonomous mode,
  a control source and further establishing control and data communication with the selected control source;
wherein said vehicle control unit being capable of controlling the electric driving system EDS based on instructions received from the selected control source and using input from at least said onboard sensors arrangement, so that:
  at the first control mode, at least when the electric vehicle is a slave vehicle articulated to a master vehicle, to select the control source providing the instructions to the master vehicle, to establish control and data communication between the master vehicle and the vehicle control unit, and to enable at least partial self-driving of the slave vehicle based on electric energy accumulated in said battery (so as to share driving force with the master vehicle), and
  at the second control mode, at least when the electric vehicle is not articulated to the master vehicle, to enable driving of the electric vehicle autonomously.

In one embodiment of the control system, the vehicle control unit may be responsible for selecting a power management mode suitable for enabling said at least partial self-driving of the slave vehicle (e.g. for enabling regeneration and battery charging whenever possible.

The control system for controlling the described electric vehicle may be alternatively formulated as comprising a vehicle control unit being configured
  to select:
    the first or the second control mode, a control source from a number of selectable control sources, a suitable power management mode for controlling the electric driving system,
  to establish:
    data and control communication with the electric driving system (and an onboard sensors arrangement of the electric vehicle, if installed) and
    data and control communication with the selected control source.

In a further embodiment, the control system may also comprise
  a master computer in communication with a master onboard sensors arrangement on a master vehicle,
  a first gateway GW1 in communication with the master computer,
  a second gateway GW2 in communication with the vehicle control unit, and/or an internal control means in communication with the vehicle control unit.

In one specific embodiment, the control system may comprise at least one communication cable adapted to interconnect the vehicle control unit either with GW1 or with GW2.

In one specific embodiment, the control system for controlling the electric vehicle (being a modular electric vehicle EVMOD) may comprise:
  a first and a second sub-systems for respectively using them at the first and the second control modes, wherein the first sub-system for controlling the EVMOD at the first, articulated mode includes:
  an onboard computer on the MV in communication with an onboard sensors arrangement of the MV,
  a first gateway GW1 in communication with said MV onboard computer and an outside control source;
  a module control unit MODCU, in communication with an onboard EVMOD sensors arrangement, for controlling EDS of the EVMOD;
  a communication cable for data and control exchange between GW1 and the MODCU;

the second sub-system for controlling the EVMOD at the second, autonomous mode includes:
  said vehicle control unit being a module control unit (MODCU), in communication with
  said onboard sensor arrangement of the EVMOD, for controlling the EDS of the EVMOD;
  a second gateway GW2 in communication with the MODCU and the same or another outside control source,
  and/or an internal control means constituting an internal control source adapted to establish data and control communication with the MODCU;
  a communication cable for data and control exchange between the second gateway GW2 and the MODCU;
said control system being adapted for reconfiguring it from the first sub-system to the second sub-system and back when required, for respectively controlling the EVMOD at the first control mode or at the second control mode.

The control system may be responsible for control of driving, braking, steering and power management of the EDS in the EVMOD. The power management further comprises management of the electric battery charging in the EDS of the EVMOD.

Further, the control system may be designed to collect and process data about terrain, distance of the drive, selected mode of driving (for example, the economy mode with electric energy regeneration), requirements on the battery charge in general and/or at the end of the distance, so as to issue control commands for optimal management of the EVMOD resources.

At the first control mode the control system may be configured to enable at least partial self-driving of the electric vehicle based on energy currently accumulated in the battery. The battery may be charged from an outside power source and/or controllably recharged while regenerating the electric energy by the electric motor.

As mentioned, the electric energy regeneration in the EVMOD may be provided while driving, braking and even when steering, depending on the selected power management mode. The battery may be controllably charged from the motor and/or from external sources.

The management of the battery charging may be based on collecting data on the current battery charge and fulfilling its charge according to a selected strategy. If the selected strategy is arrival to destination at the minimal time, the battery will be almost empty at the destination. However, if the selected strategy is to bring a maximally charged battery to the destination, the control system will calculate the power management so that the battery will be always recharged while driving.

In case of controlling a tandem EVMOD comprising two mechanically coupled similar EVMODs interconnected via a communication cable, their control system may allow selecting an arbitrary power management mode for any of the two EVMODs. For example one of the EVMODS may be controlled according to a motoring mode, while the other of the EVMODS may be controlled according to a regeneration mode; when needed (say, when at least one of the batteries is sufficiently charged), the power management modes may be re-selected vice-versa, to ensure that at any time at least one of the EMODS is capable of self-driving and at least one of the EMODS preserves its battery sufficiently charged.

Optionally, the control system may be configured to enable exchange of electric energy between EVMODs, for example between single EVMODS in a tandem configuration, and/or between adjacent slave vehicles in the articulated assembly.

According to a fifth aspect of the disclosed subject matter, there is provided a module control unit MODCU for use in a modular electric vehicle EVMOD comprising an electric driving system EDS, the MODCU being configured
to select the first or the second control mode, a control source from one or more selectable control sources, a power management mode for the EVMOD,
and to establish:
data and control communication with the EDS, and
data and control communication with the selected control source.

It should be mentioned that the EDS may incorporate an onboard sensors arrangement, and the vehicle control unit (for example, MODCU) may be in communication with said sensors arrangement.

The MODCU may comprise an assembly of at least four separate processors (say, in the form of four swappable PCBs) configurable for issuing to the EVMOD control signals to respectively control at least driving, braking, steering and power management of the electrical driving system EDS of the EVMOD.

According to still a further aspect, there is provided a set of vehicles adapted to be articulated to one another, the set comprising at least the described EVMOD. The EVMOD may be configured as a single EVMOD or as a tandem EVMOD. The set may additionally comprise a master vehicle MV and/or one or more slave vehicles. The vehicles in the set may be articulated, thereby the set may become an articulated vehicles assembly.

BRIEF DESCRIPTION OF THE DRAWINGS

The proposed subject matter will be further described and illustrated by the following non-limiting drawing, in which:

FIG. 1 also illustrates a simplified block diagram of the control system (i.e., of its first sub-system for controlling the EVMOD articulated to a master vehicle MV.

FIG. 2 also illustrates the second sub-system of the control system, responsible for controlling an autonomous EVMOD.

DETAILED DESCRIPTION OF SPECIFIC EMBODIMENTS

Figure 1:
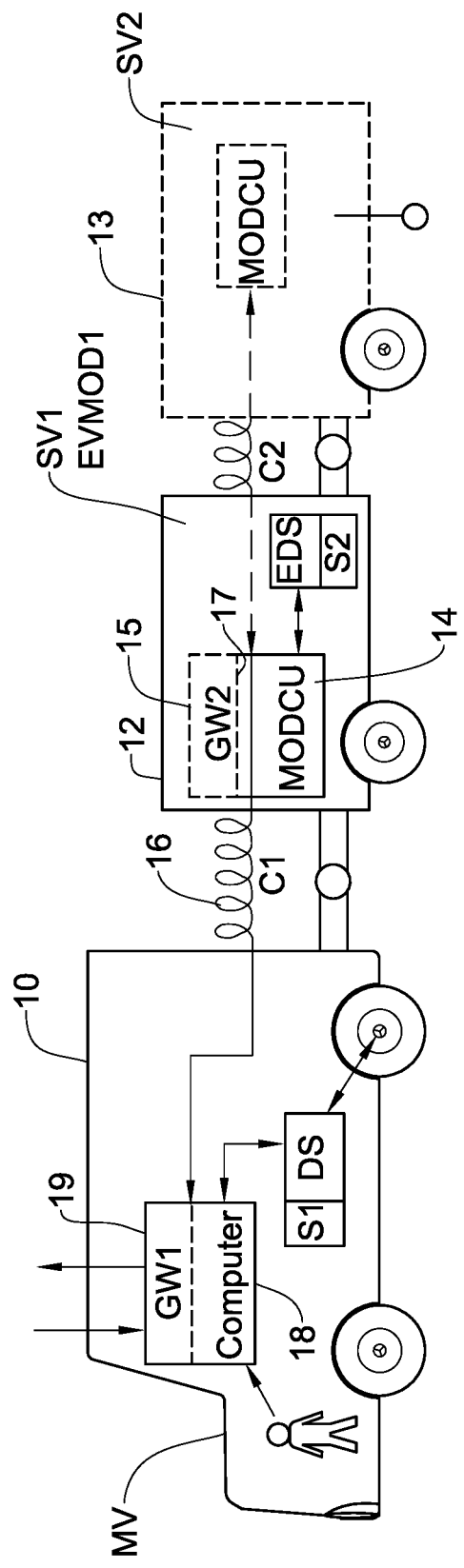
FIG. 1 is a simplified block diagram illustrating one embodiment of the proposed Electric Vehicle Module EVMOD in an articulated vehicles assembly. The EVMOD is shown as a single EVMOD1.

FIG. 1 illustrates an example of articulated vehicles assembly where an arbitrary master vehicle MV (10) pulls at least one exemplary articulated slave vehicle SV1 (12).

The master vehicle 10 can be configured to be manipulated by a user/driver, whilst the slave vehicle 12 can be manipulated by a control system. The assembly may further comprise additional slave vehicle/s (14) connected to the master one at least indirectly. According to some embodiments of the presently disclosed subject matter, the slave vehicles can be connected also to one another similarly, from their back or front, using an articulation system, for example the articulation system developed by the Applicant and described in the US 2020/0062306.

The first of the slave vehicles (SV1, 12) is an electrical vehicle having a controllable electrical driving system EDS (11) associated with an arrangement of slave sensors S2. Optionally, the vehicle SV1 may also comprise a regular internal combustion engine (not shown) and may thus turn into a hybrid-electric vehicle. The second slave vehicle SV2 (13) is shown in dotted lines, as articulated in a queue. However, it may be not electrical and be even not controllable. In this figure, the slave vehicle SV1 is understood as an Electrical Vehicle Module EVMOD1 (12), which may function in an articulated mode and in an autonomous mode. The module EVMOD1 may have two or more wheels (only one pair of wheels is shown in solid lines in this drawing), but is still considered "a single" EVMOD.

EVMOD1 (12) is provided with the module's control unit MODCU (14).

In the articulated mode, SV1 is controllable by its control unit MODCU (14), which receives data and control signals via a communication cable C1 (16) from a computer 18 of the master vehicle MV (10), which in turn receives instructions from a selected outside control source (it may be a driver, a remote control base, etc.) The instructions may comprise commands, tasks, selected power management modes, telemetry data etc. Remote control sources may be in communication with the computer 18 via GW1 (19). Still, the control unit MODCU (14) of the SV1 (12) considers readings of its own sensors S2.

In the autonomous (non-articulated) mode EVMOD1 may be controlled by the module's control unit MODCU (14), receiving instructions from a selectable outside control source (which may be the same or another control source). The selected outside control source may be, for example, a remote base station capable of controlling the EVMOD1 (by, say, Cellular, VHF, UHF, L-band, S-band, C-band, etc.) via GW2 (15) being in communication with the vehicle's MODCU (14). Similarly, the MV (when de-articulated and de-wired from the EVMOD1) may serve as an outside control source transmitting its instructions from GW1 (19) to GW2 (15).

Another example of a control source may be an autonomic hardware & software package (17) installable at the EVMOD, say to enable its basic safe movement whenever de-articulated and de-wired from the MV. In one embodiment, such an autonomous package 17 may form an optional part of the GW2. In another embodiment, such internal control source 17 may be part of the MODCU (14).

Still another example of the outside control source can be a wired remote control unit (say, for manipulating the EVMOD from a shelter via a long wire switched to the MODCU 14).

In FIG. 1, the master vehicle MV has its driving system DS (20) associated with a master's sensors arrangement 51 for monitoring the driving system 20. The MV is provided with an onboard computer 18 cooperating with a Gateway GW1 (19) which is configured for communication with outside, remote control sources. Based on processing the sensors' 51 readings and considering the commands/instructions received at the computer 18 from the driver and/or the outside control source, the computer 18 & the GW1 (19) issue control signals to slave vehicles.

The EVMOD1 (12) is controlled by a Module Control Unit MODCU (14). In the articulated mode, MODCU 14 receives control signals from GW1 via a communication cable 16 (for example, using CANBus, Ethernet or the like protocols).

In the autonomous mode, the MODCU of the EVMOD1 may receive control signals via its gateway GW2. GW2 may be either provided inside in communication with MODCU (shown in dotted lines), or may be installed on the EVMOD1 as an add-on (see FIG. 2).

The GW2 and/or the MODCU may be provided with hardware/software means for checking safety of the EVMOD. For example, in case there is no communication and there is an indication that GW2 is destroyed, safety measures will take steps to protect the vehicle from wrong actions (say, the brakes will be activated and the Inverter will be put off, see FIG. 3).

The MODCU 14 is configured to provide driving, braking, steering and power management control to EDS 11. As mentioned, the EDS 11 comprises a battery (for example, a high voltage Battery pack, see FIG. 3). The power management control of the EDS includes management of its battery charge in order to maintain the battery charged by using energy regeneration in the EDS. In a simple motoring mode, the regeneration is possible when braking and going downhill; in a simple generation mode, regeneration is possible almost permanently.

The proposed EVMOD1 is maintained in a position ready to share the driving (pulling) effort with the MV, at least in some modes. For example, when driving uphill, the EVMOD1 may push the MV thus assisting it by applying a part of the required power. When driving downhill, the EDS 11 of the EVMOD may regenerate energy and recharge its battery.

The MODCU 14 may be designed to ensure various power management modes, depending on a given current terrain and given tasks, and to issue control commands according to the selected mode.

The power management modes used by the proposed electric vehicle may be for example: an economy mode with energy regeneration, a mode of fast arrival to destination, a mode of the maximal battery recharge (i.e., arrival to destination with a maximally possible charge of the batteries, etc.). By default, the battery of the proposed EVMOD may be in the process of charging owing to regeneration whenever it occurs possible, thus enabling self-driving of the EVMOD whenever required.

The second SV2 may be an electric vehicle and may thus comprise its own EDS and MODCU (shown in dotted lines). The MODCUs of the vehicles in the chain may be all in data/control communication via the communication cable C1 and communication cable/s C2 (22) (shown in dotted lines).

A power supply cable (not shown) may also be provided between the vehicles, though it is not mandatory.

FIG. 1 also illustrates a first sub-system of the proposed control system, intended for control of the EVMOD1 in its articulated mode. The first sub-system comprises the MV computer 18 associated with GW1 at one end and the sensors arrangement S1 at another end. The GW1 19 receives the driver's control signals, other control signals if any, the computer 18 processes them together with readings of the sensors S1 and via GW1 and C1 (16) controls MODCU of the EVMOD1, which in turn controls EDS 11 of the EVMOD1.

The EVMOD1 is equipped with its own onboard sensor arrangement (S2) comprising a number of sensors adapted to monitor at least its driving system EDS (11) and to transmit their readings to the MODCU of the EVMOD1. When issuing control signals concerning the driving, steering, braking and power management functions in the EDS (11), readings of the EDS sensors are taken into account at the MODCU 14. The sensors may be various, for example sensors responsible for detecting temperature, oil pressure, voltage, current; the sensors may include gyro-sensor, acceleration sensor, compass, etc.

Figure 2:
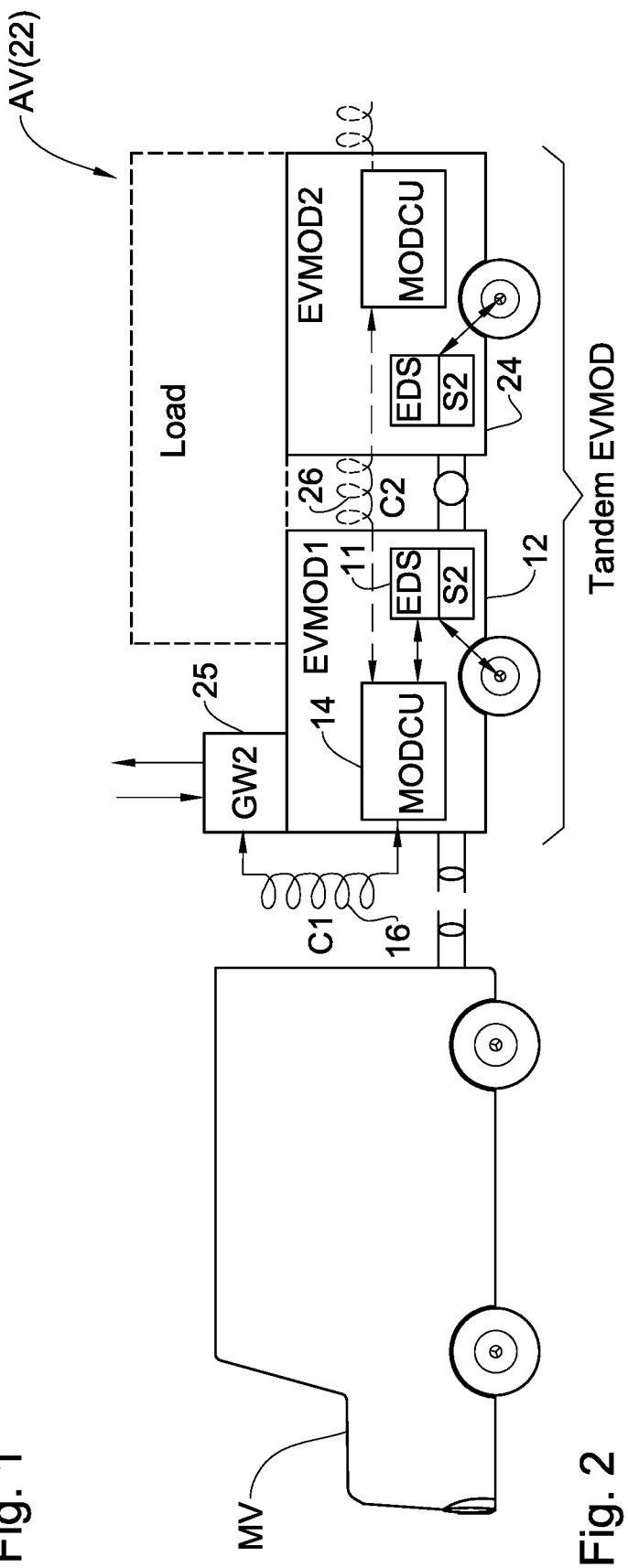
FIG. 2 schematically illustrates one embodiment of a tandem-EVMOD ready for its autonomous mode of operation.

FIG. 2 illustrates one example of an autonomous vehicle AV (22). Here, it is a "tandem" or "robotic" EVMOD implementation, formed from a single module EVMOD1 (12) and a similar module EVMOD2 (24), connected to one another in tandem. The two single vehicles in the tandem module may be coupled by a rigid connector.

EVMOD1 is provided with a Gateway unit GW2 (25), for example capable of receiving and issuing RF waves. GW2 (25) is shown as mounted on top of the EVMOD1 (12), in order to provide the AV with an ability to communicate with remote outside control sources. GW2 (25) is connectable to the MODCU of EVMOD1 via the communication cable C1 (16). When de-articulating the EVMOD1 from the MV, the cable 16 may just be detached from GW1 (19) of the MV and re-connected to GW2 (25) of the EVMOD1 (12).

The MODCUs of the two single modules EVMOD1 (12) and EVMOD2 (24) are interconnected via a second communication cable C2 (26). One of the MODCUs may be assigned to become the "master" MODCU (say, MODCU of the EVMOD1) and is then updated about new tasks/commands/selected modes of power management and about current sensors' readings at both of the modules. The MODCU 14 of EVMOD1 then issues signals to control driving, steering, power management and braking of the EDS systems of the two modules so as to fulfil the given tasks, commands and/or the selected modes of power management.

The second sub-system of the control system is schematically illustrated in FIG. 2 as follows. The second sub-system of the proposed control system is intended for control of the EVMOD1 in its autonomous mode. It comprises the MODCU 14 cooperating with the sensors arrangement S2 at the EDS 11, as well as with the GW2 (25). The GW2 receives control signals from the selected control source, translates them for MODCU 14 of the EVMOD1, and the MODCU in turn controls EDS systems of the EVMOD1 and EVMOD2. Since MODCUs of the tandem EVMOD are interconnected with the same bus formed by the communication cables C1, C2 (16, 26) to exchange data and control signals, the second EDS of the module (24) is controlled accordingly.

MODCUs and GWs may be provided with safety monitoring means (not shown) which constantly check all critical circuits. If, for example, the GW2 is destroyed, the safety means will detect it and the MODCU may immobilize the EVMOD (say, by braking the EDS and putting the Inverter of the electric engine OFF)

Any EVMOD may carry a load. FIG. 2 schematically shows the load on the tandem module by dotted lines.

Figure 3:
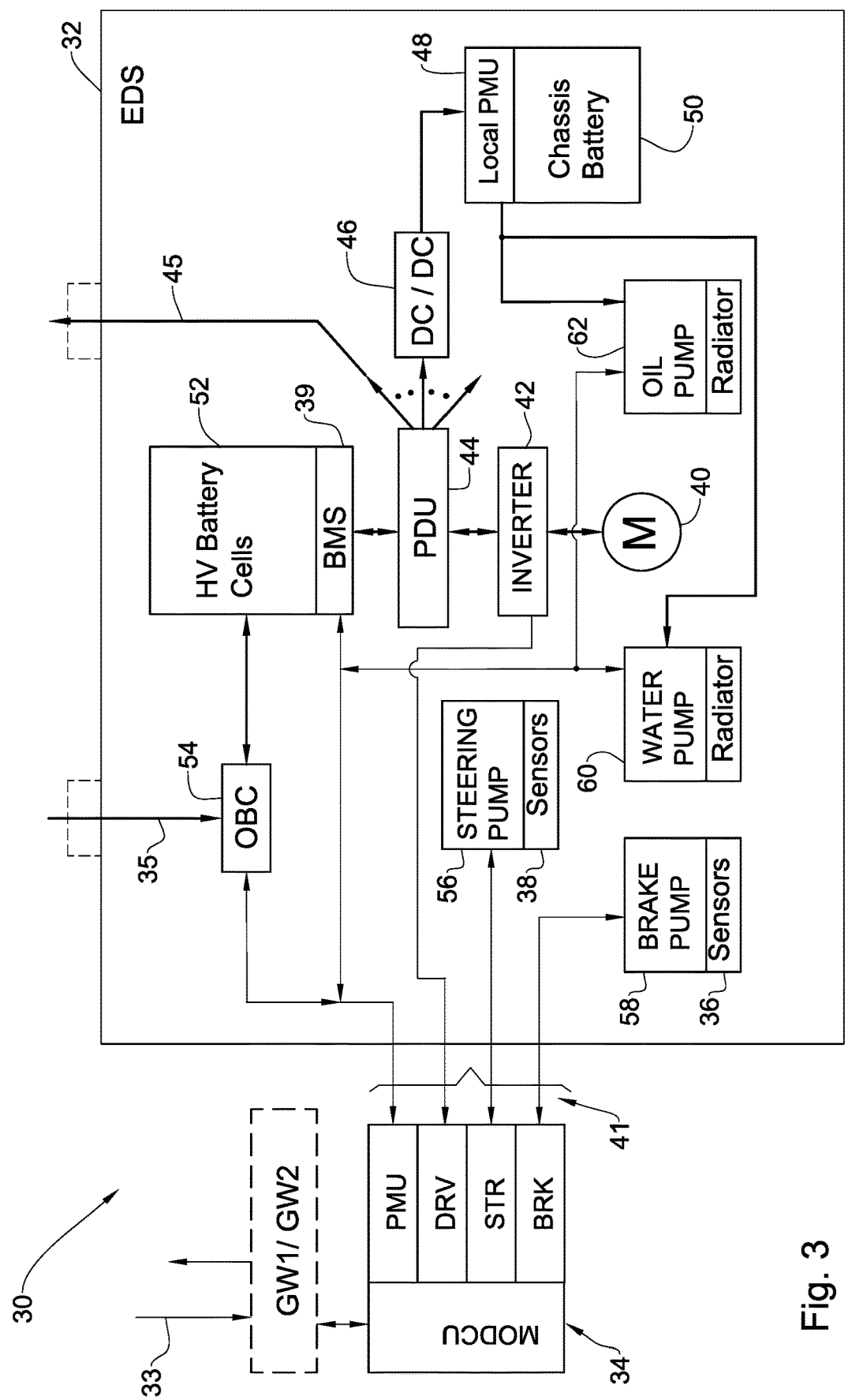
FIG. 3 is a simplified block-diagram of one embodiment of the controllable electric driving system EDS in the proposed EVMOD.

FIG. 3 illustrates one example of the proposed control system 30 for controlling the Electric Driving System EDS (32) of the described EVMOD, in more details.

The control system 30 generally comprises a Module Control Unit (MODCU 34) which performs the following: receives control commands (33) from a selected outside source, for example via gateway GW1 (19 in the articulated mode) or GW2 (15, 25 in the autonomous mode), collects data from various sensors of the EDS (for example, from 36, 38, 39), processes the received information and issues control signals to the EDS. The lines along which data and control signals are exchanged between the MODCU 34 and EDS 32 are thin lines marked with (41). The sensors 36, 38, 39 may bring information on the current condition of: steering pump, brake pump, charge of battery cells, etc.

Control commands 33 may define destination, modes of power management, data on terrain, various operations to be performed with the load of the EVMOD, etc. (Control of operations with the load is schematically shown by means of a communication cable C4 in FIGS. 4, 5.)

The MODCU 34 is schematically shown as an assembly of four processing units respectively responsible for Power management (PM Unit), Driving control (DRV), Steering control (STR) and Braking control (BRK). Each of the four processors receive data from corresponding sensors and issue suitable control signals. Each of them is provided with a closed loop control (secondary feedback) for its safety.

As mentioned, thin lines in the diagram show data/control lines. They may be implemented using local communication cables.

Thick lines in the diagram show electricity supply lines.

In the diagram:

M (40)—an electric motor/generator

Inverter 42—responsible for switching the EDS from motoring to generation, according to decision of the MODCU.

PDU (44)—Power Distribution unit with a number of outputs. One of the outputs (45) may be used for charging an external device/equipment (for example OBVP, another electric vehicle, etc.).

DC/DC (46)—converter

Local PMU (48)—Power management unit for a Chassis battery 50.

BMS (39)—Battery management system, for checking and balancing charge of the Battery 52;

Battery (52)—in this example, a high voltage (HV) battery pack with a plurality of controllably chargeable battery cells. For instance, it may be a Lithium-Iron battery which stands voltage and temperature changes as well as mechanical deformations.

OBC (54)—On Board Charger, for charging the HV battery 52 from an outside power source (for example, from a 220 VAC on/off grid, see arrow 55).

Steering pump (56) of the electric vehicle, controllable at least in the articulated mode.

Brake pump (58)

Water pump (60) with its radiator

Oil pump 62 with its radiator

Examples of Power Management Modes

When the EVMOD is in a motoring mode, the slave control unit MODCU 34 may be configured to enable energy regeneration and battery 52 charging, at least when the EVMOD performs braking and/or driving downhill. When the EVMOD is in a regeneration mode, the slave control unit MODCU 34 may be configured to enable the energy regeneration and the battery charging in any state of its driving system EDS (driving, braking, steering).

Selection of a current power management mode for EVMOD may be done by the master vehicle (driver and/or master's computer), or by the slave vehicle autonomously (by its MODCU 34).

For example, in case the electric vehicle is articulated to a master vehicle and its power management mode is first defined as regeneration, it may almost permanently perform regeneration of electric energy and charging of its battery. However, when the master vehicle needs assistance (for example, whenever it drives uphill), the master vehicle's computer may issue an instruction to the MODCU 34 (say, via GW1) to adjust the power management mode of the slave vehicle. EVMOD may then switch to such a motoring mode which allows at least partial self-driving of EVMOD, using the energy currently available in its battery.

Another example may be when the master vehicle instructs a tandem EVMOD to use a motoring mode in order to help moving the master vehicle uphill. However if, for example, batteries of the tandem EVMOD are not sufficiently charged, the MODCU 34 may decide that one EMOD of the tandem will perform the motoring using its battery, while the other EMOD of the tandem will do the regeneration to charge its battery, thus preserving the tandem EMOD ready for further tasks. The selected modes may be interchangeable.

Example of Implementing the Steering Control by the STR Processing Unit of 34

In the articulated mode, the STR processing unit is configured to receive input signals from the onboard sensor arrangement of the master vehicle and the slave vehicle (36, 38, 39), and produce corresponding output signals to the EDS 32 to manipulate the slave steering pump 56 so as to maintain the master vehicle and the slave vehicle aligned along the common longitudinal axis, at least when the master vehicle performs a turn on the horizontal plane.

In the articulated mode, the steering control system may comprise a steering control processor of the master computer, which is configured to receive, from the master's onboard sensor arrangement, input steering signals indicative of the location of the master ICOR (instant center of rotation), and produce corresponding output steering signals to the MODCU 34 and further to the Steering pump 56 to manipulate the slave steering system 32 for bringing the location of the slave ICOR to a location closer to that of the master ICOR, than it had prior to receiving the output steering signals.

The slave steering system and the master steering system can comprise a slave steerable axle and a master steerable axle, respectively. Normally, in a wheeled vehicle, this is the axle connecting between two steerable wheels of the vehicle.

The control system can be configured to manipulate the slave steering system to move the slave steerable axle in a direction opposite to that of the master steerable axle.

Each of the vehicles can comprise one or more steerable wheels, and the control system can be configured, when the master steerable wheels are oriented at a first angle with respect to the common longitudinal axis when viewed from above, to maintain the steerable wheels of the slave vehicle at a second angle correlated with the first angle.

The wheels of the slave vehicle can be drivable and can be configured, when the wheels of the master vehicle are driven at a first velocity, to be driven at a second velocity which is correlated with the first velocity.

The steerable wheels of the master vehicle can be disposed at the front of the master vehicle, and the master vehicle can further comprise non-steerable rear wheels.

The control system can be configured to manipulate the steerable wheels of the slave vehicle so as to prevent translational dragging of the non-steerable wheels on a ground surface when the master vehicle performs a turn thereupon.

In any mode (articulated or autonomous), the control steering system may further be adapted to control the EVMOD wheels in a "crab walking" manner.

Figure 4:
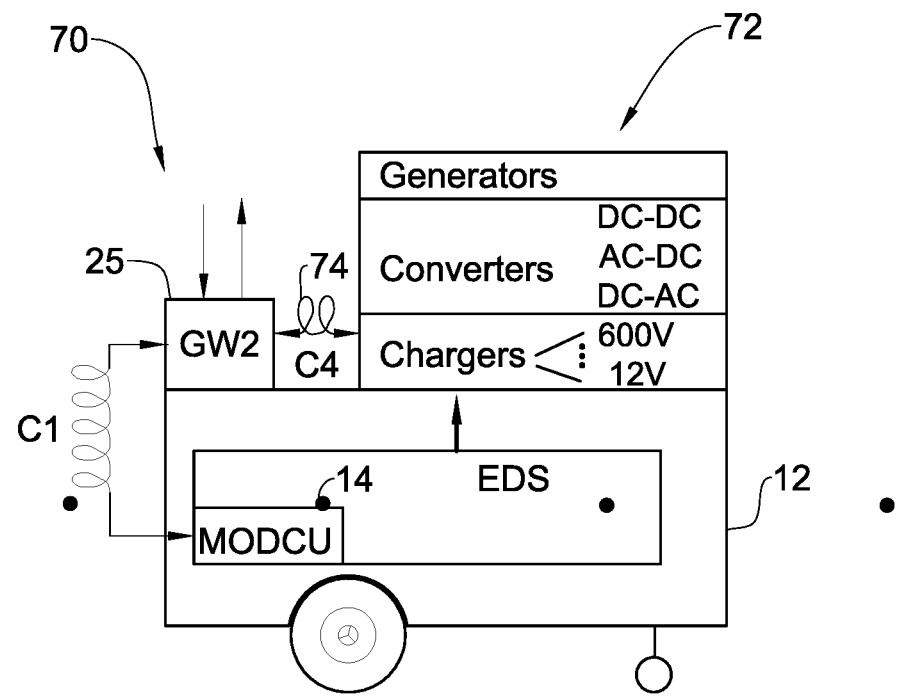
FIG. 4 is a simplified block-diagram of one embodiment of the EVMOD serving as a mobile power station.

FIG. 4 is a schematic illustration of one embodiment of the proposed Electric Vehicle Module EVMOD serving as On Board Vehicle's Power unit (OBVP).

The EVMOD may be a single module 12 (as shown in the drawing) or a tandem one capable of independently driving to a destination, when in the autonomous mode.

The load 72 may comprise: generators, converters, chargers for various types of electric and electronic equipment, for example for HV batteries of other vehicles, for drones, computers, telephones, smart glasses, etc.

Any one of the load components may be fed from the HV battery of the EVMOD.

The load may optionally be adapted also for bringing spare canisters with fuel.

The GW2 (25) of the EVMOD (12) may receive commands by RF channels or the like, for example about destination to which the load should be brought. Condition of the load components and of the HV battery cells may be reported to the GW2(15) via a communication line/cable C4 (74), so that the GW2 (74) may update the remote control source on that and issue suitable control signals to the MODCU 14. Actually, any MODCU may be equipped with a "power layer" comprising one or more components similar to those shown in the drawing as 72.

Figure 5:
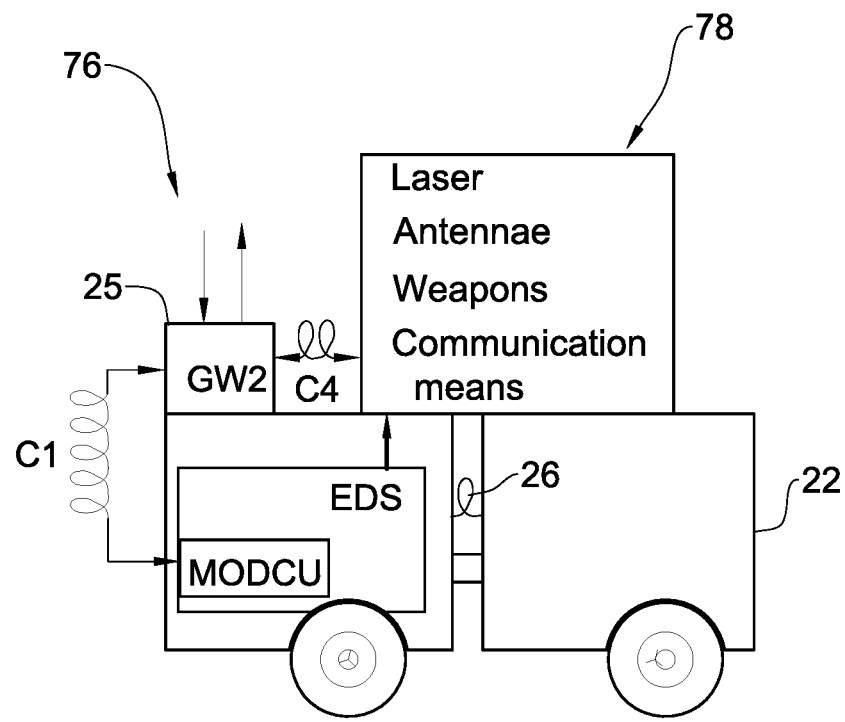
FIG. 5 is a simplified block-diagram of another embodiment of the EVMOD serving for transporting and controlling other equipment.

FIG. 5 is a schematic illustration of another embodiment 76 of the proposed EVMOD (for example, a tandem module 22) serving as a platform for transporting other equipment 78. The communication line C4 may be used for controlling the equipment from the GW2 (25) using various communication protocols for respective equipment, and reporting to the GW2 about actions taken.

Figure 6:
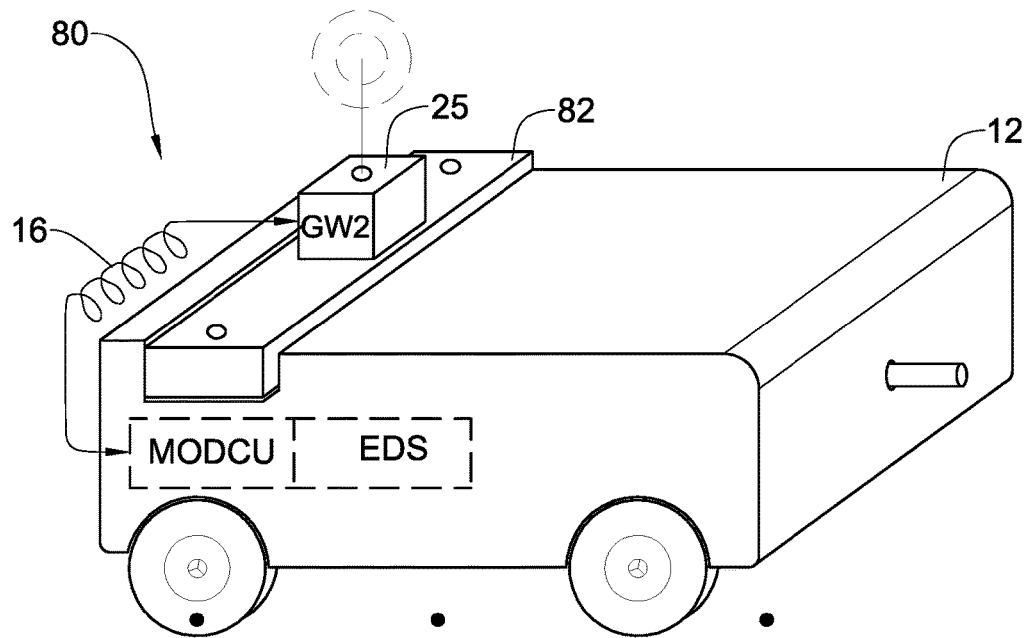
FIG. 6 is a simplified illustration of the proposed add-on appliance for detachably mounting a gateway unit on an EVMOD.

FIG. 6 illustrates an example of an add-on product (appliance) 80 which may be used for equipping an EVMOD (12, 24, 22) with a gateway. The GW2 (25) may be mounted on a detachable plate 82 which can be secured on top of the EVMOD so that the GW2 could be connected to the MODCU of the EVMOD via a communication cable 16 (for example, using CANBus, Ethernet etc. protocols).

Figure 7:
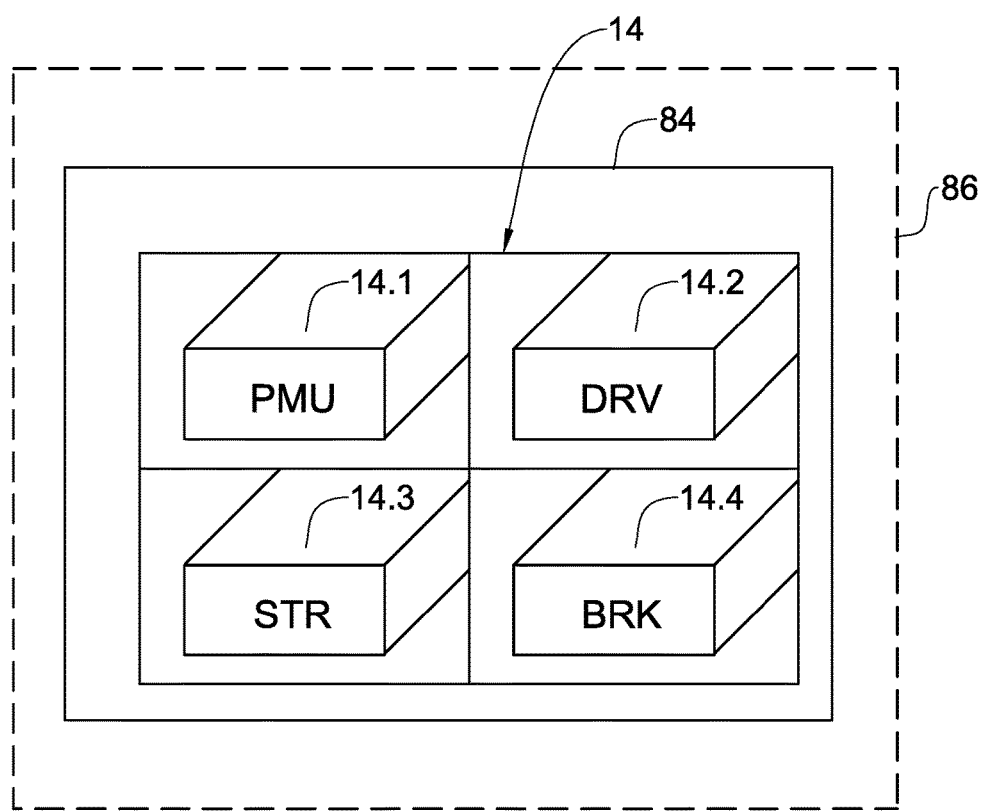
FIG. 7 is a schematic illustration of one exemplary arrangement of the Module Control Unit MODCU.

FIG. 7 illustrates a one exemplary design of the proposed MODCU (14). The MODCU 14 may be formed as an assembly of at least four swappable processors PMU, DRV, STR and BRK (14.1, 14.2, 14.3, 14.4) installable in a common compartment 84 of the vehicle, which compartment can easily be protected from damages by a common protective plate 86 which can stand explosions, accidents, electromagnetic waves, humidity etc. It should be noted that the four processors may be based on four identical hardware circuitries configurable by suitable software so as to become respective control blocks of PMU, DRV, STR and BRK. They may also include safety means monitoring status of the equipment ("keep alive" signals etc.) in a closed loop. The same protected compartment may also accommodate a swappable PCB carrying the GW2 (not shown).

While the invention has been described with reference to specific embodiments, it should be appreciated that other embodiments of the proposed controllable electric vehicle may be built, various versions of its control system may be configured, and that such embodiments and modifications form part of the invention as formulated in the claims which follow.

The invention claimed is:

1. A controllable electric vehicle operable
   to be articulated as a slave vehicle (SV) to a master vehicle (MV) having a master driving system, a master computer and a master onboard sensors arrangement,
   to be articulated to another controllable electric vehicle and to serve as a master vehicle for said another controllable electric vehicle when articulated thereto and to control said another controllable electric vehicle, and
   to be independently driven when not articulated to the master vehicle;
   said electric vehicle comprising:
      an electric driving system (EDS) having an electric motor and an electric battery;
      said electric motor, when operating as an electric generator, being capable of regenerating electric energy for charging said battery;
      a slave control unit capable of selecting a control source from at least two selectable control sources for establishing control and data communication there-with,
      a slave onboard sensors arrangement;
      wherein said slave control unit is operable to control the electric driving system using instructions received from the control source selected by the slave control unit and an input from at least the slave onboard sensors arrangement, wherein:
         at a first control mode, at least when the electric vehicle is the slave vehicle articulated to the master vehicle, to select from said at least two control sources a control source providing the instructions via said master computer, to enable establishing communication between said master computer and said slave control unit, to enable at least partial self-driving of the slave vehicle based on electric energy accumulated in said battery, and to share driving force with the master vehicle (MV) by applying at least a part of power required to drive the master vehicle (MV) by at least partially pushing the master vehicle (MV) and assisting in maneuver thereof,
         at a second control mode, at least when the electric vehicle is not articulated to the master vehicle, to drive the electric vehicle autonomously.

2. The controllable electric vehicle according to claim 1, wherein said slave control unit is operable to select the first or the second control mode and to selectively receive said instructions using one of at least two following entities: a first device installed at the master vehicle and operable for receiving remote control signals, a second device installable at the slave vehicle and configurable for receiving remote control signals.

3. The controllable electric vehicle according to claim 1, being a controllable modular electric vehicle (EVMOD) comprising at least a single EVMOD with the electric driving system having at least two driving wheels.

4. The controllable electric vehicle according to claim 3, wherein said EVMOD is operable to be interconnected in tandem with a second EVMOD, thereby forming a Tandem EVMOD.

5. The controllable modular electric vehicle according to claim 4, wherein said EVMOD and said second EVMOD forming the Tandem EVMOD are mechanically coupled and adapted to establish control and data communication with one another; said EVMOD and said second EVMOD being respectively controllable according to two selectable power management modes.

6. The controllable electric vehicle according to claim 3, wherein the EVMOD is operable to be articulated, as a slave vehicle, to a master vehicle MV carrying its onboard MV computer in communication with the master's sensors arrangement,
said EVMOD being provided with:
said electric driving system (EDS),
said slave control unit being the module's control unit (MODCU) in cooperation with said
electric vehicle sensors arrangement, for controlling the electric driving system EDS, wherein
the MODCU is controllable from said selectable control source by using an entity respectively selectable from the following:
a first Gateway (GW1) installed at the MV in communication with the MV computer,
a second Gateway (GW2), installable at the EVMOD in communication with the MODCU,
an internal, autonomous control means installable in the EVMOD in communication with the MODCU,
said EVMOD being operable to switch between the first, articulated control mode and the second, autonomous control mode.

7. The controllable electric vehicle according to claim 3, wherein the slave control unit is operable as at least four separate processors to respectively control at least steering (STR), driving (DRV), braking (BRK) and power management (PM) functions of the EDS.

8. The controllable electric vehicle according to claim 3, adapted for controlling an operation thereof, depending on a character of a load carried by the EVMOD, and depending on instructions received at the EVMOD from the selected control source.

9. The controllable electric vehicle according to claim 3, wherein the EVMOD serves as an on-board vehicle power station (OBVP) carrying one or more items from an electric generator, a converter, an inverter, a charger.

10. The controllable electric vehicle according to claim 9, wherein the on-board power station OBVP enables power exchange between EVMODs.

11. The controllable electric vehicle according to claim 1, wherein the control and data communication between the slave control unit and the selected control source is established using a communication cable switchable between the selectable control sources.

12. The controllable electric vehicle according to claim 1, wherein the slave control unit is operable to calculate different power management modes depending on received instructions, and to issue control commands to the EDS according to the calculated power management mode.

13. A set of vehicles adapted to be articulated to one another, the set comprising at least one controllable electric vehicle according to claim 1.

14. A modular electric vehicle (EVMOD) comprising an electric driving system comprising an electric motor and an electric battery, a vehicle control unit and a sensor arrangement, the EVMOD is operable to:
be selectively articulated to a master vehicle (MV),
serve as a master vehicle for another EVMOD when articulated thereto, and to control the another EVMOD via the vehicle control unit, and
be controlled from a selectable control source via the vehicle control unit, either in a first, articulated mode of the EVMOD, or in a second, autonomous mode of the EVMOD, wherein said control source being selected to be in communication with the vehicle control unit via one of at least the following: a first Gateway (GW1) installed at the MV, a second Gateway (GW2) installable at the EVMOD,
wherein in the first, articulated mode, the EVMOD is operable for at least partial self-driving and for sharing driving force with the MV by applying at least a part of power required to drive the MV by at least partially pushing the MV and assisting in maneuver thereof, and the electric motor being capable of regenerating electric energy, operating as an electric generator for charging said battery, and
wherein in the second, autonomous mode, the EVMOD is further operable to serve as the master vehicle for another EVMOD when articulated thereto, and to control said another EVMOD via the vehicle control unit, or when the EVMOD is not articulated to the master vehicle, the EVMOD is operable to drive autonomously using input from the sensor arrangement.

15. The modular electric vehicle EVMOD according to claim 14, operable to carry and control an operation of one or more of electric and electronic appliances from an electric generator, an inverter, a converter, a charger.

16. The modular electric vehicle EVMOD according to claim 14, assigned as EVMOD1 connected in tandem with another similar EVMOD assigned as EVMOD2, wherein the electric driving system of EVMOD1 and the electric driving system of EVMOD2 being respectively controllable according to selectable, separate power management modes.

17. The controllable electric vehicle according to claim 14, provided with an add-on appliance comprising a Gateway unit detachably mountable on the EVMOD and operable to enable data and control communication between the Gateway unit and the vehicle control unit via a communication cable.

18. A control system operable to control an electric vehicle comprising an onboard sensors arrangement and an electric driving system (EDS) having an electric motor and an electric battery;
the vehicle control system comprising at least a vehicle control unit capable of selecting
a control mode being either a first, articulated mode or a second, autonomous mode,
a control source and further establishing control and data communication with the selected control source;
wherein said vehicle control unit is operable to serve as a master vehicle control unit for another electric vehicle when the electric vehicle is articulated to said another electric vehicle, and to control said another electric vehicle, wherein said vehicle control unit is further operable to control the electric driving system EDS based on instructions received from the selected control source and using input from at least said onboard sensors arrangement, so that:

at the first control mode, at least when the electric vehicle is a slave vehicle articulated to a master vehicle (MV), to select the control source providing the instructions to the master vehicle, to establish control and data communication between the master vehicle and the vehicle control unit, to enable at least partial self-driving of the slave vehicle based on electric energy accumulated in said battery and to share driving force with the master vehicle by applying at least a part of power required to drive the master vehicle (MV) by at least partially pushing the master vehicle (MV) and assisting in maneuver thereof, and at the second control mode, at least when the electric vehicle is not articulated to the master vehicle, to drive the electric vehicle autonomously.

19. The control system according to claim 18, wherein the vehicle control unit is responsible for selecting a power management mode suitable for enabling said at least partial self-driving of the slave vehicle.

20. The control system according to claim 18, for controlling the electric vehicle being a modular electric vehicle (EVMOD), the system comprising a first sub-system for being used at the first control mode and a second sub-system for being used at the second control mode, wherein the first sub-system for controlling the EVMOD at the first, articulated mode includes:
  an onboard computer on the MV in communication with an onboard sensors arrangement of the MV,
  a first gateway (GW1) in communication with said MV onboard computer and an outside control source;
  a module control unit (MODCU), in communication with the onboard EVMOD sensors arrangement, for controlling the EDS of the EVMOD;
  a communication cable for data and control exchange between GW1 and the MODCU;

the second sub-system for controlling the EVMOD at the second, autonomous mode includes:
  said vehicle control unit being the module control unit MODCU, in communication with said onboard sensor arrangement of the EVMOD, for controlling the EDS of the EVMOD;
  a second gateway (GW2) in communication with the same or another outside control source and the MODCU, and/or an internal control means constituting an internal control source being in communication with the MODCU;
  a communication cable for data and control exchange between the second gateway GW2 and the MODCU;

said control system being adapted for reconfiguring it from the first sub-system to the second sub-system and back when required, for respectively controlling the EVMOD at the first control mode or at the second control mode.

* * * * *